Patented Nov. 26, 1946

UNITED STATES PATENT OFFICE 2,411,823

CATALYTIC PROCESS

Thomas F. Doumani, Long Beach, and Joseph F. Cuneo, Los Angeles, Calif., assignors to Union Oil Company of California, Los Angeles, Calif., a corporation of California No Drawing. Application December 13, 1943, Serial No. 514,106

8 Claims. (Cl. 260—597)

This invention relates to the production of unsaturated ketones by the reaction between olefins and organic acid anhydrides and relates particularly to a catalyst for this reaction.

As disclosed in U. S. Patent 2,315,046, branched chain olefins have been reacted with acetic anhydride to form unsaturated methyl ketones using sulfuric acid as a catalyst. In this reaction, however, some difficulty has been experienced which is probably due principally to undesirable side reactions whereby the olefin reacts with the sulfuric acid causing removal of the catalyst during the course of the reaction, as well as loss of olefins by polymerization. In carrying out this type of reaction it has been found that better yields of ketones are obtained when an excess of olefin over acetic anhydride is employed. However, this aggravates the loss of olefin by polymerization.

We have now discovered a catalyst for reactions of the above type which is much more effective than sulfuric acid or any other catalyst heretofore known and also causes less concurrent side reaction such as polymerization of olefins. It is an object of our invention to provide a process for the production of unsaturated ketones in higher yields than heretofore obtainable, by the reaction between olefins and organic acid anhydrides. It is a further object to provide a novel catalyst, suitable for carrying out the above reaction. Other objects will appear in the course of the following disclosure.

The novel catalyst of our invention is acetyl sulfoacetic acid, which has the following structure:

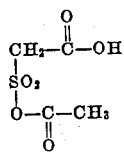

One method of preparation of this catalyst involves reacting at least two mols of acetic anhydride with one mol of substantially anhydrous sulfuric acid at a temperature between about 50° C. and 100° C. for a time between about 10 and 50 minutes. The crude product mixture obtained in this reaction contains 2 mols of acetic acid, which can be removed by distillation in vacuo or other suitable method. The remaining material is a liquid of a dark red color and moderate viscosity. This liquid is not hydrolyzed even by boiling water. It yields no sulfate ions when dissolved in water and its solutions give no precipitate of barium sulfate even when heated with barium chloride solutions. It has relatively low polymerizing effect upon olefins under the conditions employed for the production of ketones as described below. Besides acetyl sulfoacetic acid, the crude acetic acid-free product prepared as above is believed to contain smaller amounts of the following:

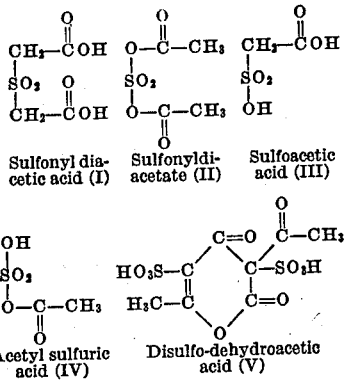

Sulfonyl diacetic acid (I)   Sulfonyldiacetate (II)   Sulfoacetic acid (III)

Acetyl sulfuric acid (IV)   Disulfo-dehydroacetic acid (V)

The acetyl sulfoacetic acid of this invention may also be prepared by methods other than that given above, such as for example (1) by reacting 1 mol of sulfur trioxide vapors with two mols of acetic anhydride, or (2) by reacting 2 mols of gaseous ketene with 1 mol of anhydrous sulfuric acid. It may also be prepared by reacting one mol of acetic anhydride to one mole of acetylsulfuric acid or sulfoacetic acid. When acetic acid is formed as a by-product, as in most of the above methods of preparation, it is preferably removed, as by distillation, before use of the catalyst, but this is not always necessary, as illustrated in the second example below. In preparing the catalyst by methods (1) and (2) or by the original method described above, more than 2 mols of acetic anhydride or ketene may be employed for each mol of sulfuric acid or sulfur trioxide, but approximately the 2 to 1 ratio is preferred.

As an example of the process of our invention a quantity of acetylsulfoacetic acid was prepared according to the first method described above by heating 40 ml. (0.7 mol) of 100% sulfuric acid of 1.84 specific gravity with 144 grams (1.4 mols) of acetic anhydride for 30 minutes at 80° C., and distilling off the 1.4 mols of acetic acid formed, under vacuum. The resulting 0.7 mol of product was mixed with 16 mols of acetic anhydride and this mixture was then added rapidly to 80 mols of diisobutylene at a temperature of about 80° C. with vigorous agitation. After only one-half hour of reaction under the above conditions a sample analyzed for ketone showed 57% conversion (based on the acetic anhydride); and after 23 hours of reaction time an analysis of the product showed over 88% conversion with only about 1% of the diisobutylene converted to higher polymers.

As a further example, 1 mol of 100% sulfuric acid was heated with 2 mols of acetic anhydride at 80° C. for about 20 minutes. The resulting catalyst containing the acetic acid was practically emulsified by vigorous stirring with a mixture of 3 mols of diisobutylene and 1 mol of acetic anhydride at 40° C. for only 1 hour. The yield of ketone based upon the acetic anhydride was 85%. The catalyst and reaction products were recovered from the reaction mixture by allowing the mixture to settle at about 20° C. Two liquid layers were formed. The lower layer was a heavy viscous liquid consisting primarily of catalyst, while the upper layer consisted primarily of unreacted hydrocarbon and ketone product and also contained much of the acetic acid produced in the reaction. The hydrocarbon layer was removed by decantation and the ketone was readily recovered therefrom by distillation. The remaining catalyst layer was treated under the same conditions as before with a mixture of 3 mols of diisobutylene and 1 mol of acetic anhydride. The yield of ketone in this second operation was about 75%, showing that very little of the catalyst activity had been lost.

Similarly, high conversions may be obtained under other reaction conditions such as other proportions of acetic anhydride to catalyst, and of olefins to acetic anhydride, and at other temperatures and reaction times. For example the ratio of acetic anhydride to catalyst may vary between about 1 to 1 and about 10 to 1, although lower and higher ratios may also be used. The ratio of olefin to acetic anhydride may vary between about 1 to 1 and 100 to 1, preferably being in the range 2 to 1 to 10 to 1. Temperatures between about 0° C. and 200° C., but preferably between about 10° C. and 80° C. may be used, shorter reaction times being employed at the higher temperatures.

Olefins other than diisobutylene may be employed under the above conditions. Monoolefins are preferred, especially monoolefins of branched chain structure, but cyclic monoolefins and straight chain monoolefins may also be employed, and even diolefins and acetylenes may be used. Examples of other branched chain olefins are isobutylene, isopentenes, isooctenes and the mixtures of olefins prepared by polymerization of monoolefins such as propylene and butenes and amylenes to form polymer gasoline and the like. Examples of cyclic olefins are cyclohexene, cyclopentene and homologs of these compounds having substituent groups of alkyl or cyclo alkyl type, as for example methyl, ethyl, propyl, cyclohexyl, cyclopentyl and like groups. Examples of straight chain olefins which may also be employed are propylene, normal butenes and the like. The straight chain olefins having 3 or more carbon atoms are preferred to ethylene, although ethylene can be reacted under some conditions.

Acid anhydrides other than acetic may be employed such as, for example, propionic anhydride, butyric anhydride, and the like.

The structure of the novel catalyst of this invention, acetyl sulfoacetic acid, may be represented as follows: $E(SO_2)RX$ where E is the acetate (ester) group $CH_3CO_2-$, R is the methylene group $-CH_2-$, and X is the carboxyl group $-COOH$. There are a number of compounds of analogous structure which are also useful as catalysts. These will be described in the following paragraphs.

(1) Compounds of the above formula, wherein R and X have the above significance, but E represents any ester group $RCO_2$, such as formate, propionate, and the like.

(2) Compounds of above formula, wherein E has the broad significance of (1), X is again carboxyl, and R is any saturated alkyl hydrocarbon group derived from a saturated alkyl hydrocarbon by loss of hydrogen. This would include the ethylene group $-CH_2CH_2-$, the isobutylene group $-CH(CH_3)CH_2CH_2-$, and the like, these two being derived from ethane and isobutane respectively. Those groups derived from hydrocarbons having less than about 4 carbon atoms are preferred.

Modifications of this invention which would occur to one skilled in the art are to be included in the scope of the invention as defined by the following claims.

We claim:

1. A process for the production of unsaturated ketones which comprises reacting an olefin with an acid anhydride of a saturated aliphatic carboxylic acid of not more than four carbon atoms in the presence of a catalyst comprising acetyl sulfoacetic acid.

2. A process according to claim 1 in which the olefin is a branched chain monoolefin and the acid hydride is acetic anhydride.

3. A process for the production of unsaturated ketones which comprises reacting sulfuric acid with an acid anhydride of a saturated aliphatic carboxylic acid of not more than four carbon atoms in the proportions of at least two mols of anhydride per mol of sulfuric acid, distilling the organic acid from the product, and contacting the residue with a mixture comprising an olefin and an acid anhydride of a saturated aliphatic carboxylic acid of not more than four carbon atoms, thereby forming an unsaturated ketone.

4. A process for the preparation of unsaturated ketones which comprises reacting an acyclic mono-olefin with an anhydride of a saturated aliphatic carboxylic acid of not more than four carbon atoms in the presence of a catalyst prepared by reacting concentrated sulfuric acid with an anhydride of the aforesaid type in the proportions of at least two mols of anhydride per mol of sulfuric acid.

5. A process for the preparation of unsaturated ketones which comprises reacting an acyclic branched chain mono-olefin with an anhydride of a saturated aliphatic carboxylic acid of not more than four carbon atoms in the presence of a catalyst comprising acetyl sulfoacetic acid, said catalyst being prepared by reacting concentrated sulfuric acid with acetic anhydride in the proportions of at least two mols of anhydride per mol of sulfuric acid.

6. A process according to claim 5 in which the carboxylic acid is acetic acid.

7. A process according to claim 5 in which the olefin is diisobutylene.

8. A process for the production of unsaturated ketones which comprises reacting an olefin with an acid anhydride of a saturated aliphatic carboxylic acid of not more than four carbon atoms in the presence of a catalyst comprising a compound having the formula $RCO_2(SO_2)RCOOH$ wherein $RCO_2$ is an ester group and both R's are a saturated alkyl group having less than four carbon atoms.

THOMAS F. DOUMANI.
JOSEPH F. CUNEO.